United States Patent [19]

Denaro

[11] 4,411,415

[45] Oct. 25, 1983

[54] COMPOUND JAW PLATE

[76] Inventor: James J. Denaro, 543 Bedford St., Concord, Mass. 01742

[21] Appl. No.: 273,236

[22] Filed: Jun. 12, 1981

[51] Int. Cl.[3] .................. B23Q 3/02

[52] U.S. Cl. .................. 269/134

[58] Field of Search .................. 269/134–138, 269/224, 262, 264, 275, 277

[56] References Cited

U.S. PATENT DOCUMENTS

| | | | |
|---|---|---|---|
| 565,425 | 8/1896 | Bolte et al. . | |
| 1,120,466 | 12/1914 | Fegley et al. . | |
| 1,124,764 | 1/1915 | Lloyd . | |
| 1,125,207 | 1/1915 | Streeter et al. . | |
| 1,454,993 | 5/1923 | Bothwell . | |
| 2,373,384 | 4/1945 | Cross et al. . | |
| 2,437,131 | 3/1948 | Shaw | 269/25 |
| 2,806,411 | 9/1957 | Backman | 269/136 |
| 2,861,492 | 11/1958 | Hokanson . | |
| 3,384,948 | 5/1968 | Flegel | 269/136 |
| 3,416,784 | 12/1968 | Wermuth et al. | 269/136 |
| 3,514,092 | 5/1970 | Lassy | 269/134 |
| 3,791,640 | 2/1974 | Clugage . | |
| 4,240,621 | 12/1980 | Daddato | 269/264 |

FOREIGN PATENT DOCUMENTS

| | | | |
|---|---|---|---|
| 712241 | 9/1941 | Fed. Rep. of Germany . | |
| 1191182 | 10/1959 | France | 269/136 |
| 283847 | 6/1952 | Switzerland . | |
| 552251 | 3/1943 | United Kingdom | 269/136 |

*Primary Examiner*—Robert C. Watson

*Attorney, Agent, or Firm*—Hamilton, Brook, Smith and Reynolds

[57] ABSTRACT

A compound jaw plate for a vise having a jaw attaching plate and a work engaging plate spaced from and movable relative to the jaw attaching plate. A pair of links are located in pivotal engagement with both plates. Elastomeric material is located between the plates. The links are positioned at acute angles relative to the intended direction of applied force for gripping a workpiece so that when force is applied, the plates move simultaneously, relatively toward each other compressing the elastomeric material and in a direction transversely of the applied force to apply an additional force to the workpiece transversely of the gripping force.

3 Claims, 15 Drawing Figures

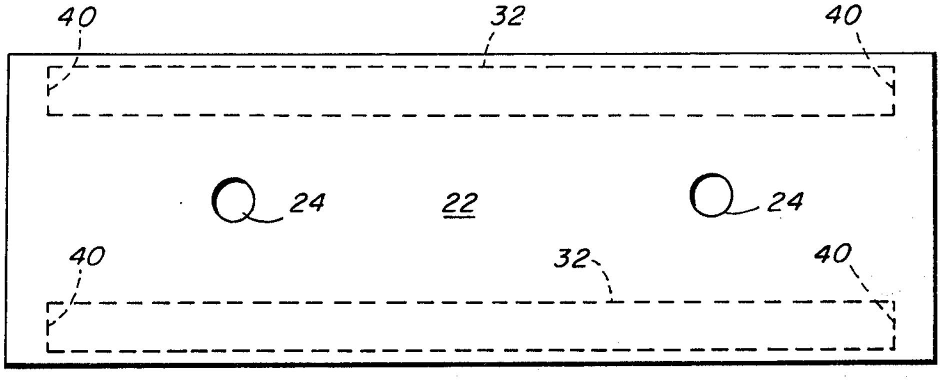
FIG. 3
FIG. 4A
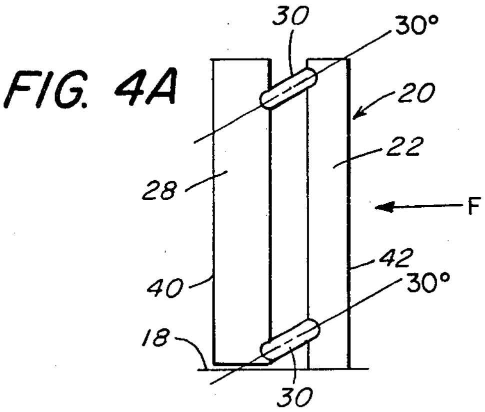
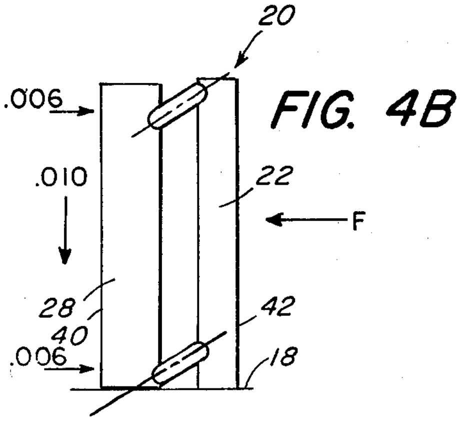
FIG. 4B
FIG. 4C
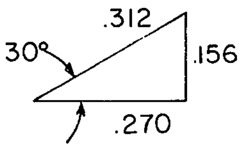
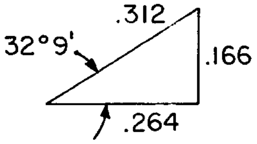
FIG. 4D

COMPOUND JAW PLATE

TECHNICAL FIELD

This invention relates to jaw plates for vises, and is particularly applicable to machine vises which hold a metal workpiece in position to be operated on by a tool such as a milling cutter which performs a precision stock removing operation.

BACKGROUND ART

In precision work such as die making or other operations requiring close tolerances, it is important that the workpiece be held firmly against the bed of the vise. It has been found, however, that there is a tendency for the workpiece to move upwardly a slight amount from the bed, not only when the jaws are tightened, but during the actual working operation.

There are many reasons why this occurs, however the greatest contributor is wear. A vise which is worn, particularly along the bed rail or key way on which the movable jaw slides, permits a few thousandths of an inch of upward movement of the movable jaw relative to the bed which results in unwanted movement of the workpiece relative to the tool. Whether this occurs during the initial application of the workgripping force or during the actual work operation itself is immaterial since in both instances the inaccurate positioning of the workpiece relative to the tool can cause the workpiece to be ruined.

The conventional solution has been to strike the workpiece with a hammer both when tightening the vise or after the workpiece has crept upwardly. This seldom solves the problem. There is no guarantee that the workpiece won't creep up again, and striking an intricate or delicate workpiece even with a soft-head hammer can damage it. Furthermore, there is no guarantee that the workpiece will return to its original position relative to the tool. This can result in a different depth of cut.

Numerous attempts have been made to rectify the problem mechanically. For example, U.S. Pat. No. 3,791,640 to Clugage discloses flexible workpiece hold-down elements for use in conjunction with the jaws of a vise. The elements are positioned to engage opposite sides of a workpiece while being compressed between the stationary and movable jaws. The hold-down members flex internally and in so doing, because of their shape, apply a force to the workpiece in a downward direction toward the vise bed. However, the engagement between the hold-down elements and the workpiece is linear. If the workpiece is struck inadvertently or if the cutting force on the workpiece is too great, it is possible for the workpiece to fly out of the vise, which can not only result in damage to the workpiece, but cause potential injury to a machinist standing close by.

U.S. Pat. No. 2,861,492 to Hokanson discloses vise jaw plates in the form of blocks which have flat surfaces for engaging a workpiece. When the jaws are tightened, the blocks move, not only to grip the workpiece, but to urge it downwardly toward the vise bed. The blocks are mounted on the jaws in order to be able to twist or pivot to accommodate a workpiece which is irregular in shape, particularly one which is wider at one end than the other. This produces an imprecise force on the workpiece and will not per se guarantee the desired positive bedding force for which the vise jaws are intended.

The two above identified patents are typical of many which are intended to solve the problem but which have inherent limitations generally of the types described.

DISCLOSURE OF THE INVENTION

With the objects of (a) gripping a workpiece tightly to prevent movement during a machine operation, (b) providing a constant and predictable bedding force to urge the workpiece positively against the bed of the vise, (c) engaging the workpiece with more than line contact, and (d) holding the workpiece immovable in spite of worn surfaces on the vise per se which tend to induce the workpiece to move upwardly away from the bed, the present invention contemplates compound jaw plates for accomplishing all of the above.

The compound jaw plate comprises a jaw attaching plate and a work engaging plate which is spaced from and movable relative to the jaw attaching plate. At least two links are positioned in pivotal engagement with both plates. An elastomeric material is located between the plates surrounding the links. The material adheres to the plates and the links and secures them in a unified structure. The links are positioned at acute angles relative to the intended direction of applied force for gripping a workpiece. Since the intended direction is substantially normal to the plates themselves, when a work gripping force is applied, the work engaging plate and the vise attaching plate move simultaneously relatively both toward each other compressing the elastomeric material and transversely of the direction of applied force to apply a second force to the workpiece. Since the compound jaw plate is attached to the jaw of the vise, the second or transverse force is the bedding force tending to urge the workpiece at all times against the vise bed.

By selectively varying the relative lengths of the links and their angular relationship to each other, the compound jaw plate can be constructed to produce different bedding force components and degrees of movement relative to the work gripping force.

DESCRIPTION OF THE FIGURES

The present invention comprises the above and other features including various novel details of construction and combinations of parts, which will now be more particularly described with reference to the accompanying drawings and pointed out in the claims. It will be understood that the particular compound jaw plate embodying the invention is shown by way of illustration only and not as a limitation of the invention. The principles and features of this invention may be employed in various and numerous embodiments and in conjunction with other types of vises without departing from the scope of the invention.

FIG. 3 is a view of an alternative compound jaw plate taken in the direction of the arrow F in FIG. 2.

FIGS. 4(A,B,C,D), 5(A,B,C,D) and 6(A,B,C,D) are schematic views of the compound jaw plate illustrating various results which can be obtained by varying the size and the angular positioning of the links.

BEST MODE OF CARRYING OUT THE INVENTION

Figure 1:
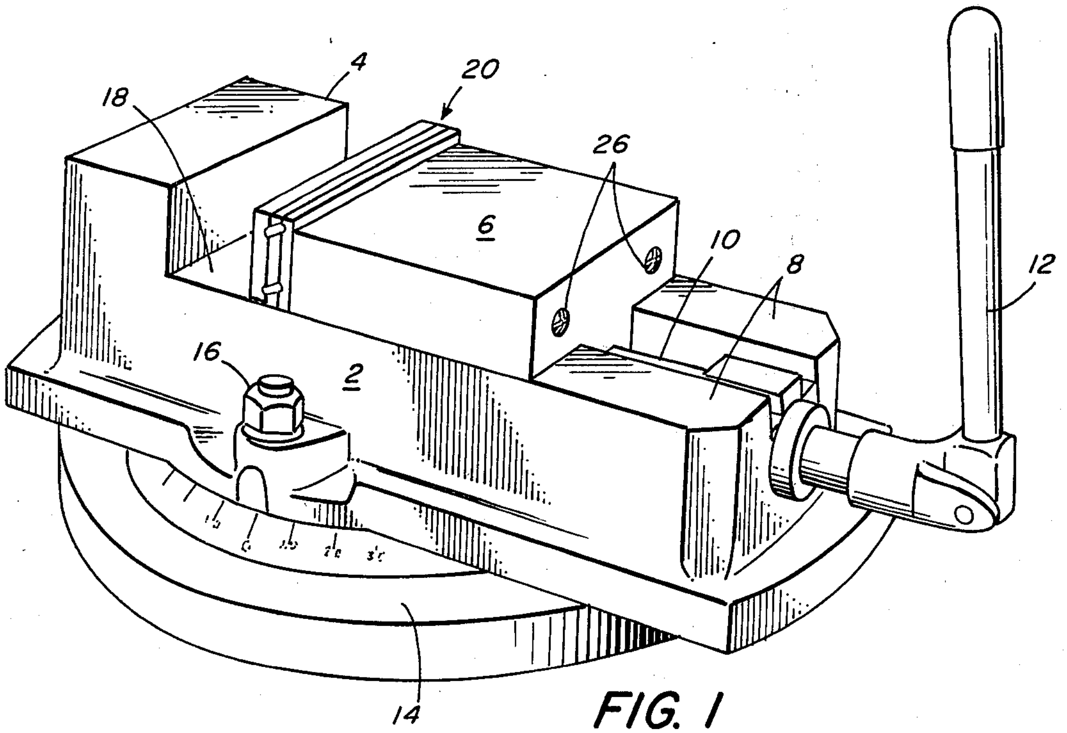
FIG. 1 is a perspective view of a conventional machine vise on reduced scale which is equipped with a compound jaw plate in accordance with the present invention.

A milling machine vise is shown in FIG. 1 comprising a main body 2, a fixed jaw 4, and a movable jaw 6 which slides on guideways or bed rails 8 toward and away from the fixed jaw under the control of a lead screw 10 rotated by a handle 12. The vise swivels on a base 14 and may be secured in the desired position by a pair of clamping screws 16, only one of which is seen in FIG. 1. The vise includes a bed 18 which a workpiece, not shown in FIG. 1, will be firmly bottomed. All of the above is representative of a conventional vise.

A compound jaw plate 20 embodying the features of this invention is shown in FIG. 1 secured to the movable jaw 6. A compound jaw plate may be secured to the fixed jaw as well. The jaw plate will be seen in greater detail in FIG. 2 with the movable jaw removed for clarity. It comprises a jaw attaching plate 22 which is drilled and tapped as at 24 in order to be secured to the movable jaw 6 by screws 26 (FIG. 1). A work engaging plate 28 is spaced from and is movable relative to the jaw attaching plate 22. A pair of links 30 extend lengthwise of the plates 22 and 28 and are pivotly received in grooves 32 formed in the plates. An elastomeric material 34, which adheres to the plates and links, fills the space between them. The plates and links are thus assembled in laminated relationship in a unified structure but are movable one to the other when force is applied. The plates 22 and 28 and the links 30 may be made of hardened tool steel and the elastomeric material may be Selastic brand 140RTV adhesive sealant made by the Dow Corning Company.

While the links 30 are illustrated as long, relatively flat rods, having rounded edges pivotly received in rounded grooves 32, it is not critical to the invention that they be so constructed. They may, for example, be generally diamond shaped in cross section and pivoted in relatively shallow etched lines in the plates 22 and 28. They would thus be thicker in the middle to prevent twisting if a large or heavy workpiece is to be gripped or if the workpiece has an irregular cross section.

As seen in FIG. 3, the pivotal links 30 and grooves 32 may be constructed shorter than the side-to-side length of the plates 22 and 28. The grooves 32 terminate in end walls 40 which are engagable with the ends of the links 30 to prevent sidewise motion of the links relative to the grooves and hence of the plates 22 and 28 relative to each other.

The compound jaw plate 20 is secured to the movable jaw 6 by the screws 26 leaving a pre-load gap 33 (FIG. 2) between the lower edge of the work engaging plate 28 and the bed 18 to permit subsequent downward movement of the plate toward the bed. This may be accomplished by either making plate 28 shorter than plate 22 in a vertical direction or if they are the same height, locating the tapped holes 24 in a position where both plates are spaced upwardly from the bed on assembly.

Figure 2:
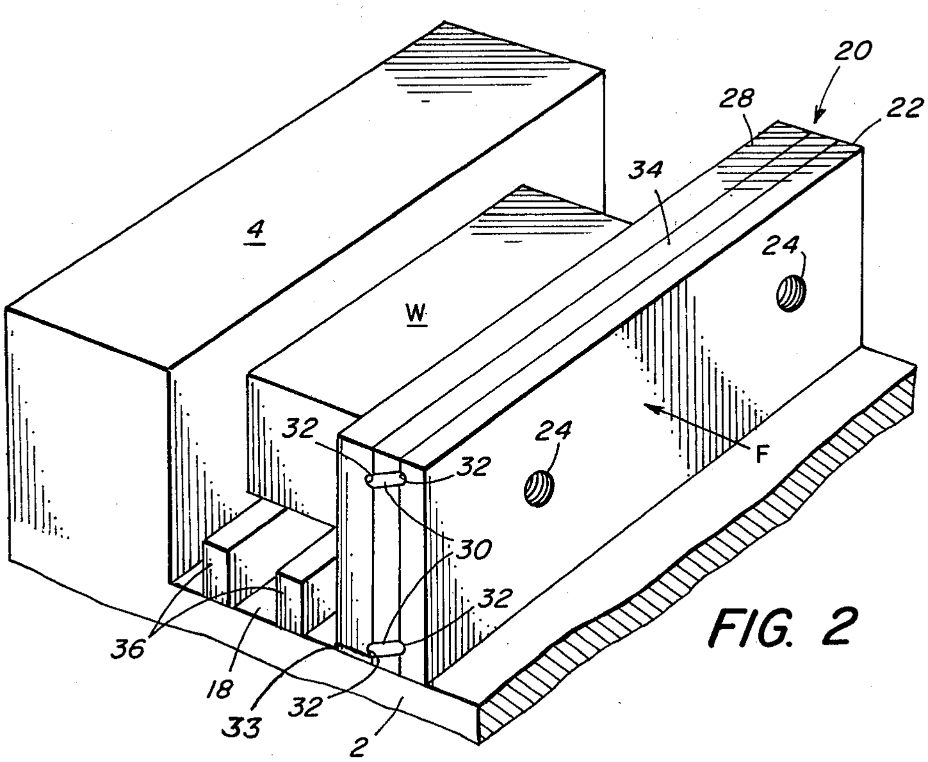
FIG. 2 is a perspective view substantially full size of the compound vise jaw in engagement with a workpiece.

As seen in FIG. 2 a workpiece W is positioned on parallel supports 36 resting on the vise bed 18. As will be described in greater detail hereinafter, the pivotal links 30 are oriented at acute angles relative to the intended direction of applied force illustrated by the arrow F. The direction of applied force is parallel to the plane of the bed 18 when the compound jaw 20 is attached to the vise 2 as shown in the various figures.

The opposite side of the workpiece W abuts the fixed jaw 4 so that when the work gripping force F is applied, the work engaging plate 28 urges the workpiece W against the fixed jaw 4. During the time of force application, the work engaging plate 28 and the jaw attaching plate 22 move relatively toward each other compressing the elastomeric material 34 while simultaneously moving transversely of each other and of the direction of applied force F. The work engaging plate 28 moves downwardly toward the bed 18 applying a transverse or downward bedding force to the workpiece. During this operation the links 30 pivot with regard to the plates 22 and 28 and since the lower ends of the links, i.e., the ends engaging the grooves 32 in the plate 28 are closer to the workpiece than the higher ends, which pivot on the plate 22, the movement of the plate 28 is downward.

While a pair of links 30 has been shown, more may be employed if desired without departing from the scope or spirit of the invention. It will be appreciated that the actual amount of relative movement of the plates is of the order of magnitude of a few thousandths of an inch as will hereinafter be described. The relative movement between the plates and hence the forces applied to the workpiece W are determined by the angular relationship between the links, and the direction of applied force as well as the lengths of the links all as will be described will refer to the examples shown in FIGS. 4 through 6.

FIGS. 4*a*, 4*b*, 4*c*, 4*d* constitute a schematic diagram of the compound jaw plate 20 in which the links 30 between the plates 22 and 28 are of equal length and oriented parallel to each other at an angle of 30° to the intended direction of applied force F which is parallel to the vise bed 18. Assuming the links each have an effective length of 0.312 inch, they are both represented by the hypotenuse of the triangle shown in FIG. 4*c*. The horizontal leg is 0.270 inch and the vertical leg is 0.156 inch.

Assuming the plates 22 and 28 move toward each other a distance of 0.006 inch in the workpiece gripping process, the links 30 pivot counterclockwise relative to the force F and the angle changes from 30° to 32°9′ as seen in FIG. 4*d*. The horizontal leg of the triangle representing the horizontal movement of the plates 22 and 28 toward each other is shortened to 0.264 inches and the vertical leg increases to 0.166 inches. The net result is that the work engaging plate 28 moves downwardly 0.010 inch relative to the jaw engaging plate 22 which is fixed relative to the bed 18 while moving toward the jaw engaging plate 0.006 inch.

Because the links 30 are parallel and of equal length, any surface on the work engaging plate 28 which was initially parallel to a surface on the jaw engaging plate 22 will remain parallel during their relative movement toward each other. The surface 42, which engages the movable jaw 6, is constructed parallel with the work engaging surface 40 of plate 28. They will always remain parallel while urging a workpiece downwardly against the base 18.

If it is desired to impart a greater downward or bedding force to the workpiece relative to the work gripping force, the links will be oriented at different angles to each other and hence with respect to the direction of applied force F.

Figure 5A:
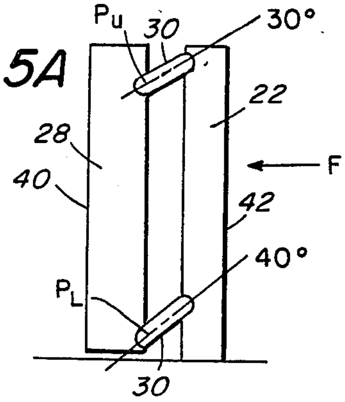
Figure 5B:
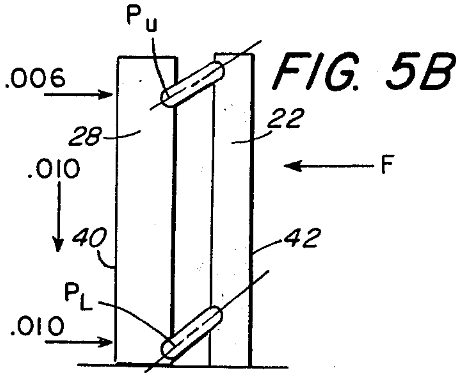
Figure 5C:
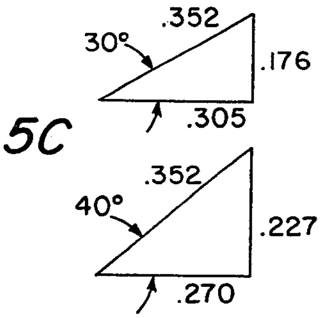
Figure 5D:
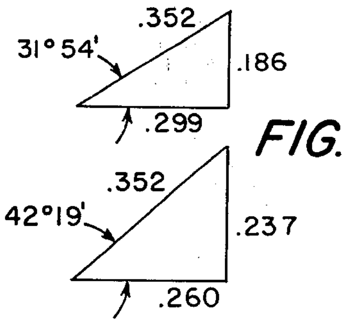
Figure 6A:
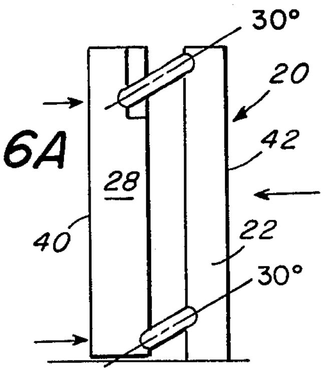
Figure 6B:
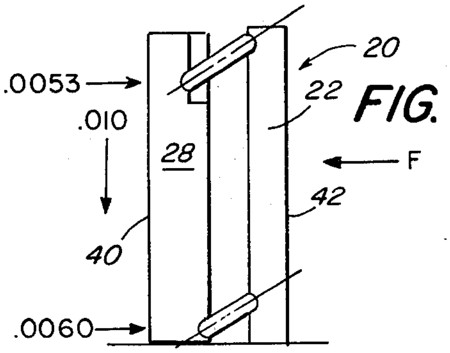
Figure 6C:
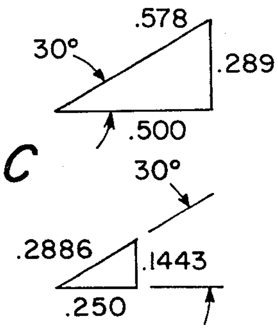
Figure 6D:
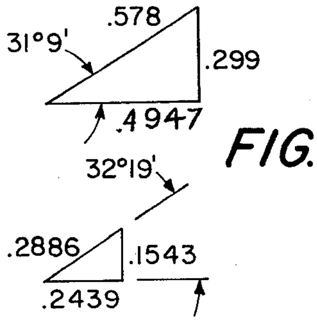

For example, FIG. 5*a* shows both links of equal effective length to wit 0.352 inches each. The upper link is disposed at an angle of 30° to the intended direction of applied force F but the lower link is at an angle of 40°. The grooves 32 in the plates 22 and 28 are cut to depths to accommodate the changed angular positioning of the links while maintaining the surfaces 40 and 42 initially parallel. The upper illustrative triangle shown in FIG. 5*c* shows the link angle of 30; the hypotenuse is 0.352 inch; the horizontal leg is 0.305 inch, and the vertical leg 0.176 inch. When the plate 28 moves from the FIG. 5*a* to the FIG. 5*b* position, the effective pivot point Pu of the upper link is shown as having moved towards the now fixed plate 28, the same amount as in the FIGS. 4*a* to 4*d* illustration, i.e., 0.006 inch. This is represented by the horizontal leg becoming 0.299 inch in the upper triangle of FIG. 5*d* and the link angle becoming 31°54′, with the vertical leg becoming 0.186 inch. In other words, the upper pivot point Pu moves the same amount as in the FIG. 4 illustration: 0.006 inches horizontally and 0.010 inch vertically.

However, because the lower link 30 of the FIG. 5 illustration was oriented at a different angle, i.e., 40° instead of 30°, the initial horizontal leg of the lower illustrative triangle of FIG. 5*c* is 0.270 inch and the vertical leg 0.227 inch. By comparing the lower illustrative triangles of FIGS. 5*c* and 5*d* it will be seen there is 0.010 inch vertical movement and 0.010 inch horizontal movement of the lower pivot point P1 vs. 0.006 inch horizontal movement of the upper pivot point Pu. This means that the work engaging surface 40 on the work engaging plate 28, which was initially parallel to the jaw engaging surface 42 on the plate 22, now pivots slightly and moves out of parallelism with the net result of a greater relative force being applied during movement to the top of the workpiece by the top of the plate 28 than the amount of force applied to the workpiece at the bottom. This means a greater hold-down or bedding force relative to the amount of work gripping force.

This feature may also be used to provide an angular correction to compensate for the upward tilt of a worn movable jaw. In like manner, FIGS. 6*a* through 6*d* illustrate the result of making the lower link shorter than the upper link, but initially aligning them at the same angle, i.e., 30° to the direction of intended gripping force F. Again, it will be seen that the plates will move out of parallelism in the gripping process, the upper link pivoting to 31°9′ the lower link to 32°19′. The result is that with 0.010 inch of downward movement of the work engaging plate 28 relative to the fixed or jaw engaging plate 22 there is a differential of only 0.0007 of an inch more movement at the bottom than at the top. It will be obvious that by constructing the compound plate 28 with toggle links set at various angles relative to each other and with lengths that are unequal, a wide range of differential motion can be obtained in accordance with how much downward force is desired relative to the amount of work gripping force.

I claim:

1. A compound jaw plate for applying a bedding force to a workpiece in a vise comprising:
- a bed;
- a jaw attaching plate;
- a work engaging plate spaced from and movable relative to the jaw attaching plate in a direction lengthwise of the bed;
- at least two links in pivotal engagement with both the work engaging plate and the jaw attaching plate;
- elastomeric material between the work engaging plate and the jaw attaching plate;
- the links being positioned at acute angles relative to the intended direction of applied force and downwardly toward the bed for gripping a workpiece;
- the links are of equal length and positioned non-parallel to each other, the links closest to the bed being inclined at a greater angle relative to the bed than the links farther from the bed;
- whereby, a surface on the work engaging plate which was initially parallel to a surface on the vise attaching plate will move out of parallelism during their relative movement toward each other to induce a greater relative force during movement to the part of the workpiece farther from the bed than to the part closer to the bed.

2. A compound jaw plate for applying a bedding force to a workpiece in a vise comprising:
- a bed;
- a jaw attaching plate;
- a work engaging plate spaced from and movable relative to the jaw attaching plate in a direction lengthwise of the bed;
- at least two links in pivotal engagement with both the work engaging plate and the jaw attaching plate;
- elastomeric material between the work engaging plate and the jaw attaching plate;
- the links being positioned at acute angles relative to the intended direction of applied force and downwardly toward the bed for gripping a workpiece;
- the links are of unequal length and positioned parallel to each other, the links closer to the bed being shorter than the links farther from the bed,
- whereby, a surface on the work engaging plate which was initially parallel to a surface on the jaw attaching plate will move out of parallelism during their relative movement toward each other to induce a greater relative force during movement to the part of the workpiece farther from the bed than to the part closer to the bed.

3. A compound jaw plate for applying a bedding force to a workpiece in a vise comprising:
- a bed;
- a jaw attaching plate;
- a work engaging plate spaced from and movable relative to the jaw attaching plate in a direction lengthwise of the bed;
- at least two links in pivotal engagement with both the work engaging plate and the jaw attaching plate;
- elastomeric material between the work engaging plate and the jaw attaching plate;
- the links being positioned at acute angles relative to the intended direction of applied force and downwardly toward the bed for gripping a workpiece;
- the links are of unequal length and positioned non-parallel to each other, the links closer to the bed being shorter and inclined at a greater angle relative to the bed than the links farther from the bed,
- whereby, a surface on the work engaging plate which was initially parallel to a surface on the vise engaging plate will move out of parallelism during their relative movement toward each other to induce a greater relative force during movement to the part of the workpiece farther from the bed than to the part closer to the bed.

* * * * *